Sept. 1, 1959  G. WANINGER ET AL  2,901,947
ADJUSTMENT OF MACHINE PARTS
Filed April 4, 1955  2 Sheets-Sheet 1

Inventors
G. Waninger
K. Engel
By

United States Patent Office 2,901,947
Patented Sept. 1, 1959

2,901,947

ADJUSTMENT OF MACHINE PARTS

Gilbert Waninger and Karl Engel, Siegen, Westphalia, Germany

Application April 4, 1955, Serial No. 499,132

Claims priority, application Germany April 7, 1954

9 Claims. (Cl. 90—16)

In the construction of machines it is very common to effect the movement of machine parts on their guides by means of screw spindles through which the whole of the forces necessary to effect the movement are transmitted. This stressing of the adjustment means results in a deflection of these means so that the final adjustment of the part to be moved on its guides does not correspond to the desired position. The same applies also to the power movement of machine parts on their guides by means of an electric motor directly connected with the machine part because here also the interposition of transmission gearing and the like is necessary and here also deflections are occasioned by the transmission of forces. An object of the invention is to overcome this disadvantage. Accordingly the invention resides in the use of follow-up controls in themselves known for the movement of machine tool parts. The advantage of follow-up control consists, as is known, in that the control itself is not loaded and therefore responds within the technically necessary limits with great accuracy. It then acts in the fashion of a relay on the actual movement imparting means and keeps this in operation until the desired fine adjustment has been effected.

It will be obvious that the use of the invention has considerable advantages in that gauging of the actual dimensions of the workpiece can be considerably reduced because the dimension for which the machine is set by the follow-up control according to the invention practically in all cases corresponds with the actual dimension of the workpiece. From this it further follows that a final adjustment and machining after setting the machine to produce the desired dimension which hitherto was as a rule not achieved with sufficient accuracy, by subsequent movements of the machine parts by hand is no longer necessary and still further the advantage is obtained that the whole of the control of the machine, particularly in large and heavy machine tools, can be constructed as a remote control with automatic corrections.

Although the invention is advantageous in the adjustment of machine parts in general on a guide, it has particular value in its use of double column machine tools such as double column planing machines, milling machines and vertical lathes with two columns. In large planing machines and milling machines the exact horizontal position of the cross beam is often undesirably influenced by the fact that during the movements of the tool head, especially in the case of a heavy tool head, in particular a milling head, through the changing point at which the load on the cross beam is applied, changes of extension in the supporting, guiding and movement imparting means, for example in the lifting and lowering spindles for the cross beam mounted in the columns, are produced which are far greater then the permissible tolerances and which cause the cross beam to take an inclined position. These conditions are in essence visible in Figure 1 of the accompanying drawings without further explanations.

Apart from this, quite generally in planing machines, independently of the gross case of changing loading by heavy tool heads, it is not possible to move the cross beam within narrow tolerances of form example ± 0.01 mm.

If this disadvantage could be overcome there would be a considerable increase in the accuracy, both in the adjustment of the cross beam and also in machining. Further, the machining possibilities would be increased for consequent upon exact adjustment of the cross beam on the columns the adjustment of the tool itself in relation to the workpiece could be effected with the cross beam.

The invention provides the possibility on one hand of automatic compensation of the inaccuracies and changes in position of the cross beam on account of changing loading conditions and on the other hand of moving the cross beam in relation to the columns in accordance with end measurements equivalent to a final adjustment. In essence the arrangement according to the invention operates in such a manner that the parts which move and support the cross beam such as screw spindles or the like are automatically regulated by a follow-up control so that a precisely horizontal position of the cross beam and if desired also a pre-determined vertical adjustment while remaining horizontal is ensured and achieved.

According to the invention accordingly a testing device for example a feeler or sensing device or some corresponding device such as a level tube, an optical control switching device or the like is combined with the cross beam of which the testing parts for example the feelers, through mechanically not loaded connecting means follow or move in advance of the cross beam in all its vertical positions and at all times accurately and reliably define the horizontal position as well as by means of their sensing members such as feelers or the like test the position at all times of the cross beam in relation to the horizontal and if necessary effect a further adjustment independently of the loading of the movement imparting mechanism such as screw spindles, thereby giving an additional adjustment determined by these sensing members. The sensing members in order to define accurately and reliably the horizontal position should be connected with the machine frame, the columns, the foundation or the like independently of the cross beam.

If such an arrangement effects only the accurate horizontal adjustment of the cross beam by additional adjustment of the means for moving it, this is not directly suitable for effecting the height adjustment of the cross beam itself. This achieved, however, in the manner already indicated above by adjusting the sensing mechanism directly from outside, that is, independently of the cross beam. This adjustment is effected for example by a servomotor. The result is an actuation of the movement imparting means controlled by the sensing device, for example the screw spindles for raising and lowering the cross beam and thereby a raising or lowering of the cross beam, in which case naturally the external action must be applied simultaneously to all the feeler members so that tipping of the cross beam is avoided. If then the external action ceases the actual raising or lowering process of the cross beam through the control devices according to the invention is also terminated. The sensing device comes into action as such and ensures the exact horizontal position of the cross beam so far as it is not already in this condition.

In this way the main problem underlying the invention of the use of a follow-up control for the moving parts of a machine is solved, as well as the subsidiary problem arising of always maintaining the cross beam in a horizontal position.

The invention will be explained with reference to some examples illustrated in the accompanying drawings.

Figure 2:
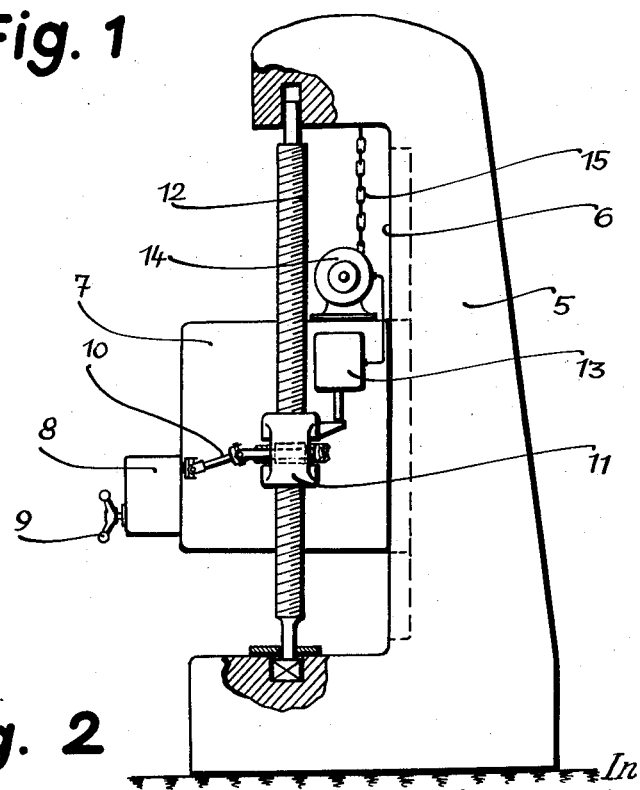
Figure 2 is a side view of a first example.

The simplified construction according to Figure 2 comprises a guide 6 on a column 5 for a carriage 7. It is immaterial what type of machine is illustrated, whether for example it represents a side tool head guided on one of the columns of a double column planing machine or whether it represents the column structure of a boring machine, or whether it represents a single column milling machine.

On the carriage 7 is mounted a control box 8 in which a small servomotor is mounted. By means of a rotatable control handle 9 the height to which the carriage is to be brought can be exactly set. A dial is actuated by rotation of handle 9 to give a reading indicating the position to which it is desired to move carriage 7. Upon changing of the dial setting by rotation of control handle 9 the servomotor not shown in the control box 8 effects the number of revolutions which corresponds to the new value set and through a shaft 10 with universal joints at each end rotates a guide nut 11 on a control screw spindle 12. Spindle 12 constitutes an elongated adjusting means for adjusting the position of guide nut or reference member 11 so that the carriage will be located as desired. The guide nut is not subjected to any particular loads beyond those of its own weight. The control spindle 12 also is completely free from loading, apart from the weight of the nut. A feeler device 13 is fixed on the carriage, by which an electric motor 14 is switched as soon as the feeler device 13 is out of equilibrium. If therefore the guide nut rises in relation to the carriage, the feeler device is moved and the motor 14 is then switched on in such direction that the whole carriage on which it is mounted is raised, for example by the aid of a chain 15 secured to the column 5. As soon as the servomotor comes to rest the guide nut 11 also comes to rest, the feeler 13 is moved out of contact and the electric motor 14 is stopped. If the nut 11 is rotated in such direction that it descends, the feeler device 13 switches the motor 14 on in the opposite direction, and the carriage 7 descends until the rotation of the nut 11 ceases and the feeler device 13 reaches its equilibrium position.

This form of the invention can be given various modifications. It is clearly possible to rotate the guide nut 11 at one of several possible speeds on the screw spindle and to arrange the feeler device in such a way that for large movements the motor 14 also either rotates more rapidly or in some other way brings the speed of movement of the carriage into closer relationship with the speed of movement of the guide nut. It is also possible to provide transmission devices of suitable ratio between the guide nut and the feeler device which enable high accuracy to be achieved.

Figure 3:
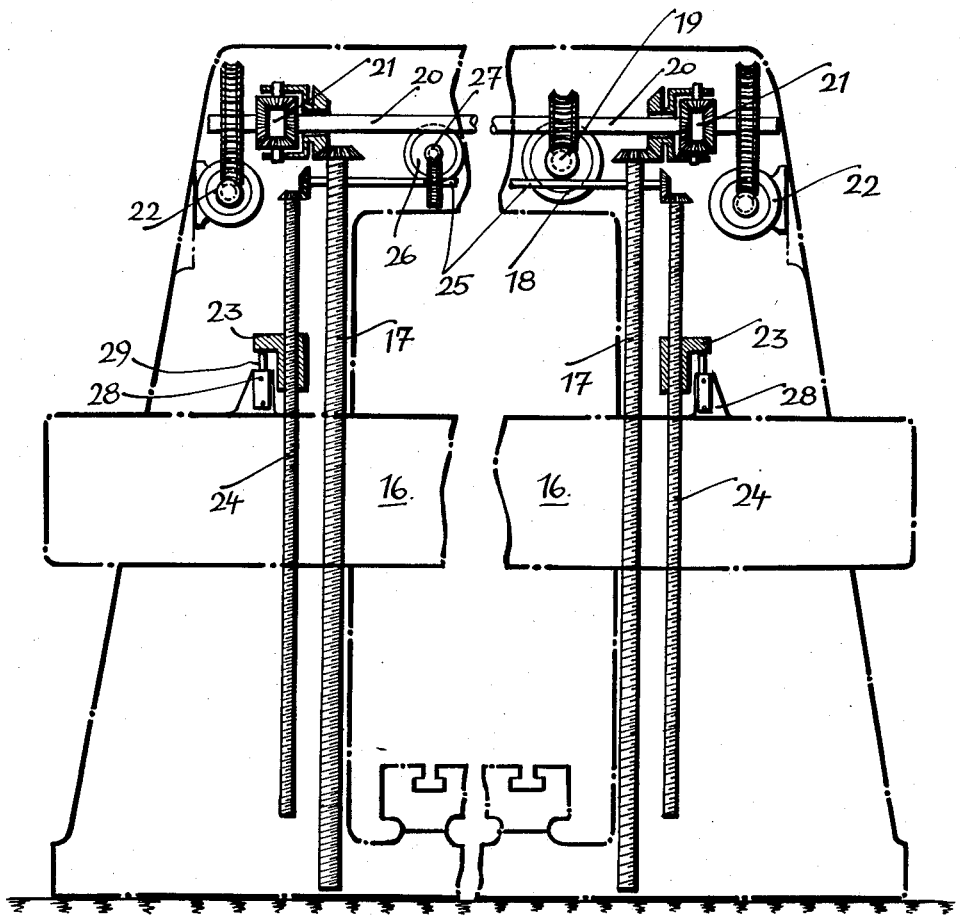
Figure 3 is a front view of part of a double column planing machine with adjustment of the cross beam in accordance with the invention.

The embodiment shown in Figure 3 of a control according to the invention for a planing machine or a milling machine comprises a cross beam 16 which is suspended on each side by means of an adjusting member which in this example is shown as a screw spindle 17. The screw spindles 17 are driven from a common adjusting motor 18 through a worm gear 19 and a shaft 20 which at each end carries one bevel gear and also supports the cage of a differential gear 21 which according to the invention is provided at each end of the shaft. According to the invention a control motor 22 is also provided for each spindle 17 which acts on the spindle through the other bevel wheel of the respective differential gear 21. The signal for the adjustment of the cross beam is given from each of two guide nuts 23, which can be adjusted by these spindles. Both control spindles or adjusting means 24 are connected to rotate together by a shaft 25 and can be rotated either by hand or as shown in the example by a small auxiliary motor 26 acting through a worm gear 27.

A most suitable manner of actuating motor 26 to relocate guide nuts 23 is by a control handle similar to handle 9 in Fig. 2, supplied with a dial to indicate the desired setting. An appropriate switch then causes motor 26 to rotate in one or the other direction the requisite number of revolutions to relocate nuts 23 to the position indicated by the dial.

Figure 1:
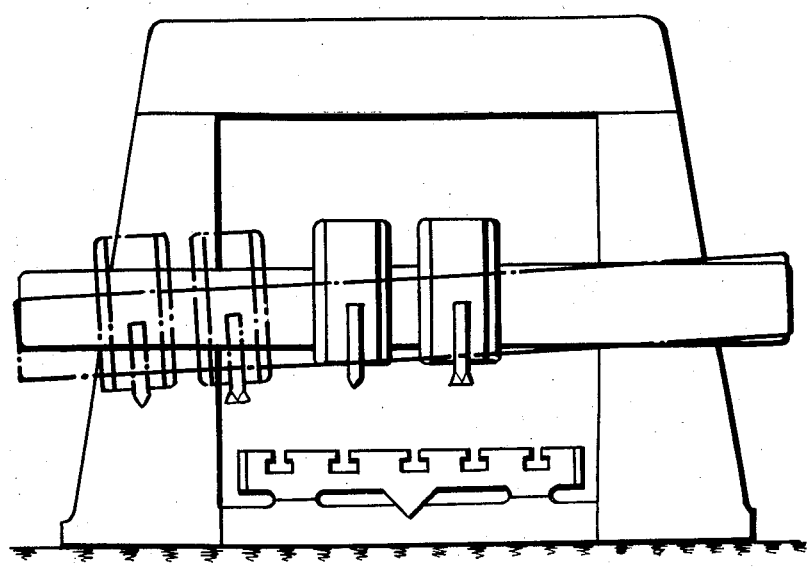
Figure 1 is a front view of a planing machine illustrating how the cross beam may become tipped.

The position of each of the guide nuts 23 is sensed by a corresponding contact feeler 29 projecting from a control switch 28. If, for example, on account of a displacement of weight along the cross beam it takes a slight inclined position such as suggested in Fig. 1, the resulting displacements of the feelers 29 in relation to the guide nuts 23 cause the corresponding control motor 22 to come into action, which through the corresponding differential gear 21 re-adjusts the cross beam 26 until the contact feelers 29 again reach zero position. It will be understood that the direction of rotation of the control motors 22 under the control of the feeler device 29 depends on the direction of motion of the corresponding end of the cross beam. To adjust the position of the cross beam the guide nuts 23 are changed in level, that is, raised or lowered so that both contact feelers 29 respond equally and simultaneously. The control switches 28 may be so constructed that when the feelers 29 are moved beyond a certain amount say, for example, 0.3 mm., the switches switch on not only the control motors 22 but also the feed motor 18 which rotates the spindles 17 to move the cross beam 16 in the requisite direction. While the feed motor 18 is running the control motors 22 remain in operation and by virtue of the action of the feelers 29 cause the cross beam to be held accurately horizontal.

Adjustment of the cross beam in accordance with end gauges is effected by setting gauge blocks between the feelers 29 and the guide nuts 23, which gauge blocks can be changed to increase or decrease the distance.

If automatic height adjustment of the whole beam can be dispensed with and only adjustment to the horizontal position is required, this can be effected by the aid of a level tube or the like mounted on the cross beam, the position of the cross beam in relation to the horizontal which is always defined by the liquid level, being sensed for example by means of floats which act through contacts or through photo-electric devices.

In this arrangement the differential gear 21 and control motor 22 is only needed at one end while the guide nuts 23 and the means for driving them are dispensed with.

On exactly the same principle it is possible to support the cross beam by means of three or more screw spindles or by means of chains or of pistons.

We claim:

1. In a machine tool having a part movable on guides, the combination of a reference member, means to accurately move said reference member to any selected position along a path parallel to said guides adjacent said part, a sensing means mounted on said part located so as to normally engage said reference member, control means including said sensing means actuated by movement of said reference member with respect to said part, primary power means for moving said part on said guide, auxiliary power means also for moving said part on said guide, said control means being arranged to actuate said auxiliary power means in response to small relative movements between said sensing means and said reference member, and to actuate said primary power means in response to larger relative movements between said sensing means and reference member, whereby large movements of said part on said guides will be made quickly under the power of both primary and secondary power means and small movements of said part on said guides will be made under the power of said auxiliary power means only.

2. A machine tool as set forth in claim 1 comprising a differential gear through which said primary power means and said auxiliary power means act for moving said part on its guides.

3. A double column machine tool having a cross beam movable vertically on the two columns, power means associated with an adjusting member at each column for imparting the vertical movement to said beam, elongated adjusting means adjacent and parallel to each column, a reference member displaceable on each said elongated adjusting means, means for effecting simultaneous and equal displacement of said reference members on said elongated adjusting means thereby to define a position, a sensing device on each end of said beam each co-acting with one of said reference members, control means actuated by the co-action between said sensing devices and said reference members to control said power means to displace each end of the beam vertically until it reaches the position determined by the corresponding one of said reference members.

4. A double column machine tool as set forth in claim 3 wherein said elongated adjusting means are screws geared to rotate together and said reference members are nuts meshing with said screws.

5. A double column machine tool as set forth in claim 3 wherein said power means comprises two auxiliary motors, one associated with said adjusting member at each column and controlled by the co-action of the corresponding sensing device and reference member.

6. A double column machine tool as set forth in claim 3 in which said power means comprises a main motor geared to the adjusting member associated with both columns for moving the cross beam and two auxiliary motors each associated with the adjusting member at one of the two columns and controlled by the co-action of the corresponding sensing device and reference member and geared to the corresponding adjusting member for moving said cross beam in relation to the column, thereby to impart respective movements to the beam additional to the general movement imparted by said main motor.

7. A double column machine tool as set forth in claim 6 wherein said main motor and said auxiliary motors are geared to the adjusting members for moving the cross beam along the guides by differential gears.

8. A double column machine tool as set forth in claim 5 wherein each said sensing device is a feeler and said control means includes an electric switch which for small displacements of the feeler switches on only said auxiliary motor and for large movements of said feeler also switches on said main motor.

9. In a machine tool having a frame and including at least one column, a vertical slide-way on said column, a horizontal tool carriage mounted for vertical adjustment on the vertical slide-way of said column, power operated weight bearing means mounted on said column to adjustably support the weight of said horizontal tool carriage on said column, power means to operate said weight bearing means, a reference member movable parallel to said slide way, a control spindle mounted on said frame parallel to said column to accurately locate said reference member with respect to said machine tool frame, a feeler switch mounted on said tool carriage to sense the location of said tool carriage with respect to said reference member, said feeler switch provided with a feeler element movable to opposite sides of a neutral position to control the direction of operating said power means whereby upon relative vertical motion in either direction between said tool carriage and said reference member by movement of either said tool carriage or said reference member said power operated weight bearing means will be actuated to move said tool carriage to its former position with respect to said reference member.

References Cited in the file of this patent

UNITED STATES PATENTS

| 1,576,266 | Biggert | Mar. 9, 1926 |
| 1,981,224 | De Vlieg | Nov. 20, 1934 |
| 2,007,180 | Doran | July 9, 1935 |
| 2,224,108 | Ridgeway | Dec. 3, 1940 |
| 2,245,558 | Johnson | June 17, 1941 |
| 2,433,194 | Bedford et al. | Dec. 23, 1947 |
| 2,564,180 | Turrettini | Aug. 14, 1951 |
| 2,667,105 | Stephan | Jan. 26, 1954 |
| 2,684,001 | Wilson | July 20, 1954 |